US 12,432,142 B1

(12) United States Patent
Donzis et al.

(10) Patent No.: US 12,432,142 B1
(45) Date of Patent: Sep. 30, 2025

(54) IPV6 ADDRESS TRANSLATION FOR COMPATIBILITY WITH MULTIPLE CARRIERS

(71) Applicant: PERFTECH, INC., San Antonio, TX (US)

(72) Inventors: Lewis T. Donzis, San Antonio, TX (US); Ryan M. Matelske, San Antonio, TX (US); Lee Carl Ziegenhals, Boerne, TX (US)

(73) Assignee: PERFTECH, INC., San Antonio, TX (US)

( * ) Notice: Subject to any disclaimer, the term of this patent is extended or adjusted under 35 U.S.C. 154(b) by 0 days.

(21) Appl. No.: 18/620,936

(22) Filed: Mar. 28, 2024

(51) Int. Cl.
*H04L 45/741* (2022.01)
*H04L 45/00* (2022.01)

(52) U.S. Cl.
CPC .......... *H04L 45/741* (2013.01); *H04L 45/566* (2013.01)

(58) Field of Classification Search
CPC ............. H04L 2101/659; H04L 61/251; H04L 69/167; H04L 61/5007; H04L 61/5061; H04L 2101/668; H04L 61/2514; H04L 69/08
See application file for complete search history.

(56) References Cited

U.S. PATENT DOCUMENTS

| 2013/0054802 A1* | 2/2013 | Donzis | G06F 16/9566 709/225 |
| 2013/0091254 A1* | 4/2013 | Haddad | H04L 61/5014 709/220 |
| 2020/0267116 A1* | 8/2020 | Osterberg | H04L 61/5092 |

* cited by examiner

*Primary Examiner* — Hitesh Patel

(57) ABSTRACT

An example operation may include one or more of storing a first IPv6 address of a router assigned by a first carrier and a second IPv6 address of the router assigned by a second carrier, assigning a plurality of IPv6 addresses of the first carrier to a plurality of devices on a local area network (LAN) served by the router, receiving a packet from a device included on the LAN, where the packet comprises an IPv6 address of the first carrier assigned to the device, replacing the IPv6 address of the first carrier within the packet to the second IPv6 address of the router assigned by the second carrier, and transmitting the packet to the Internet via an IPv6 connection of the second carrier.

14 Claims, 13 Drawing Sheets

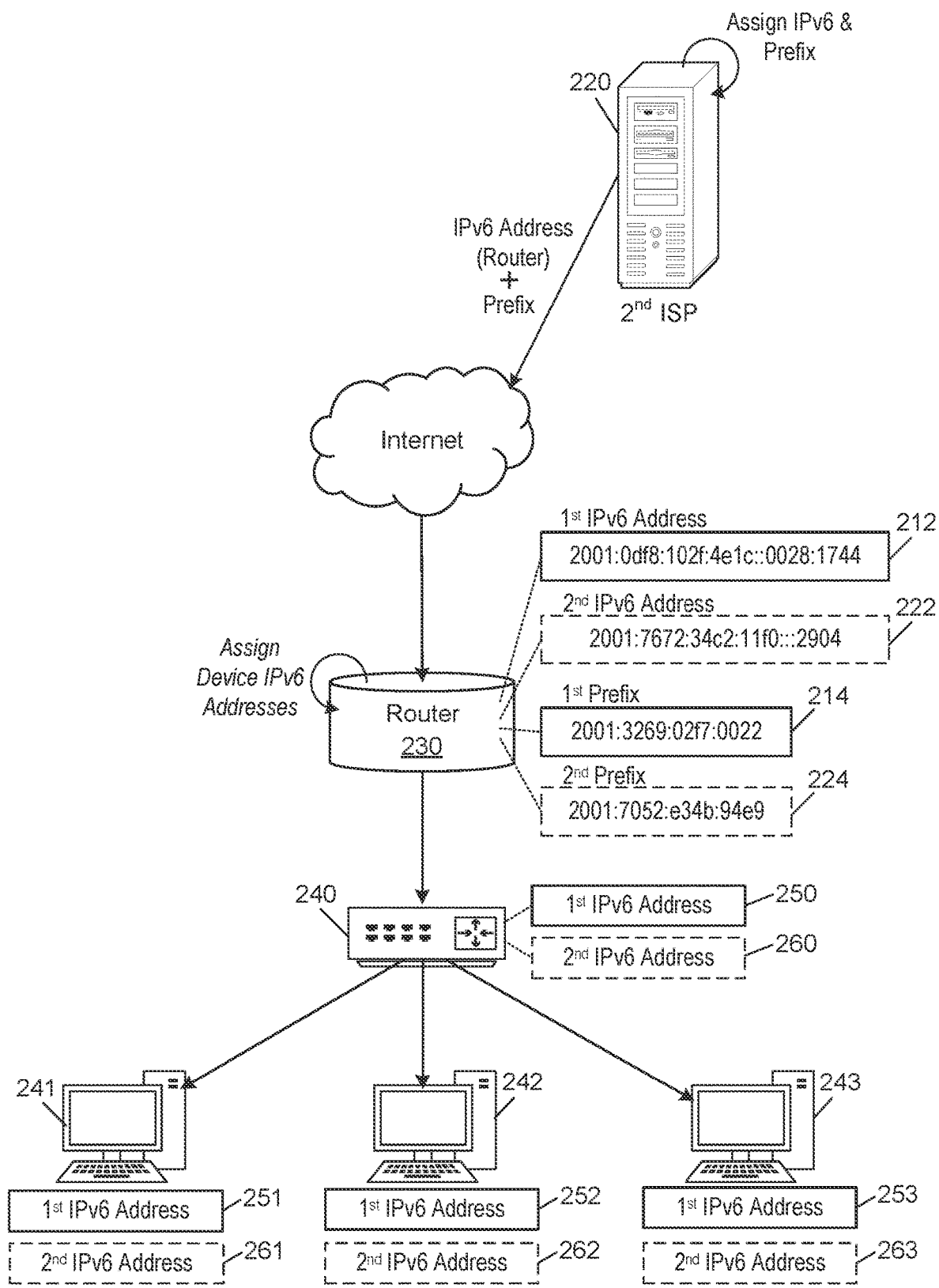

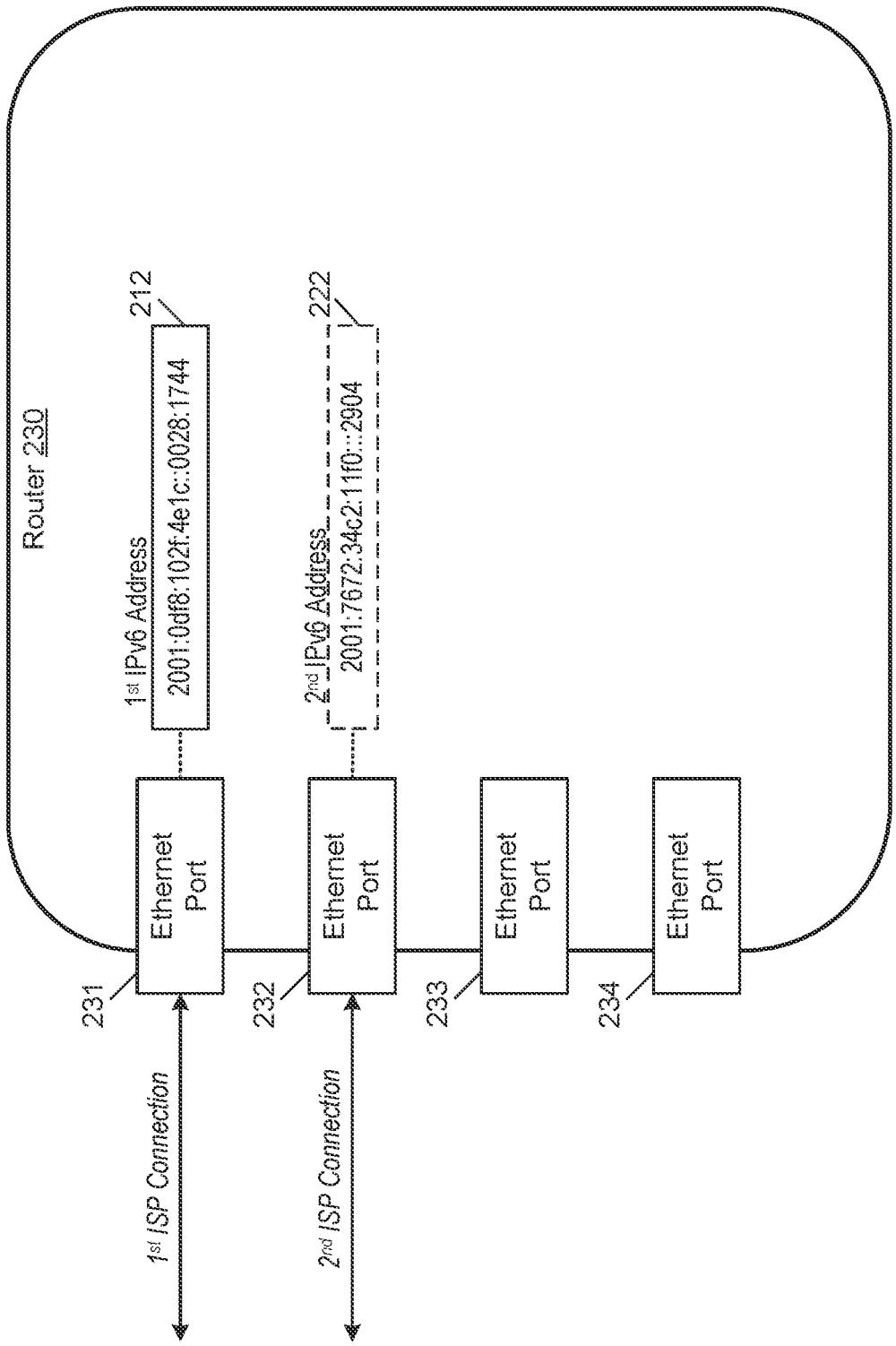

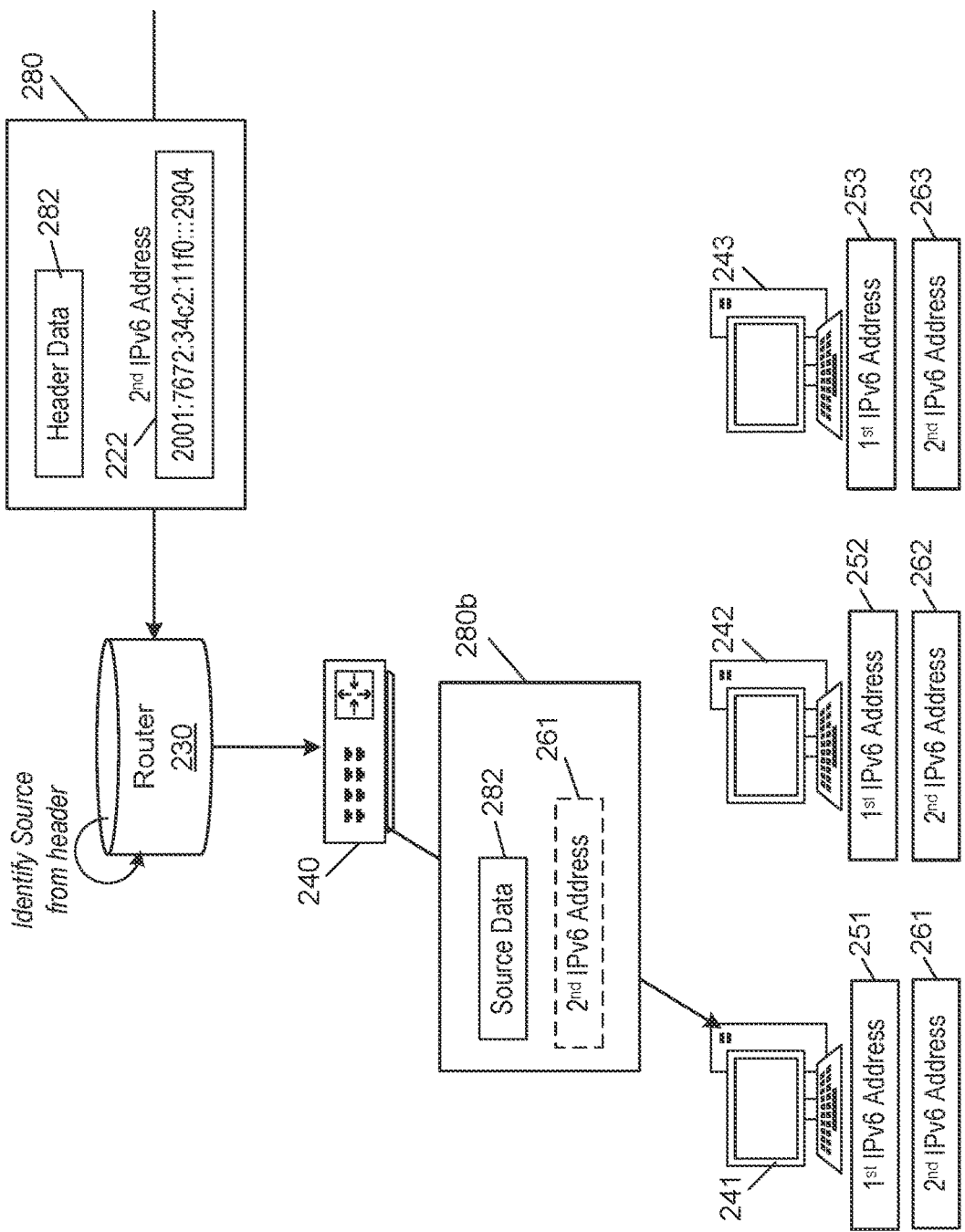

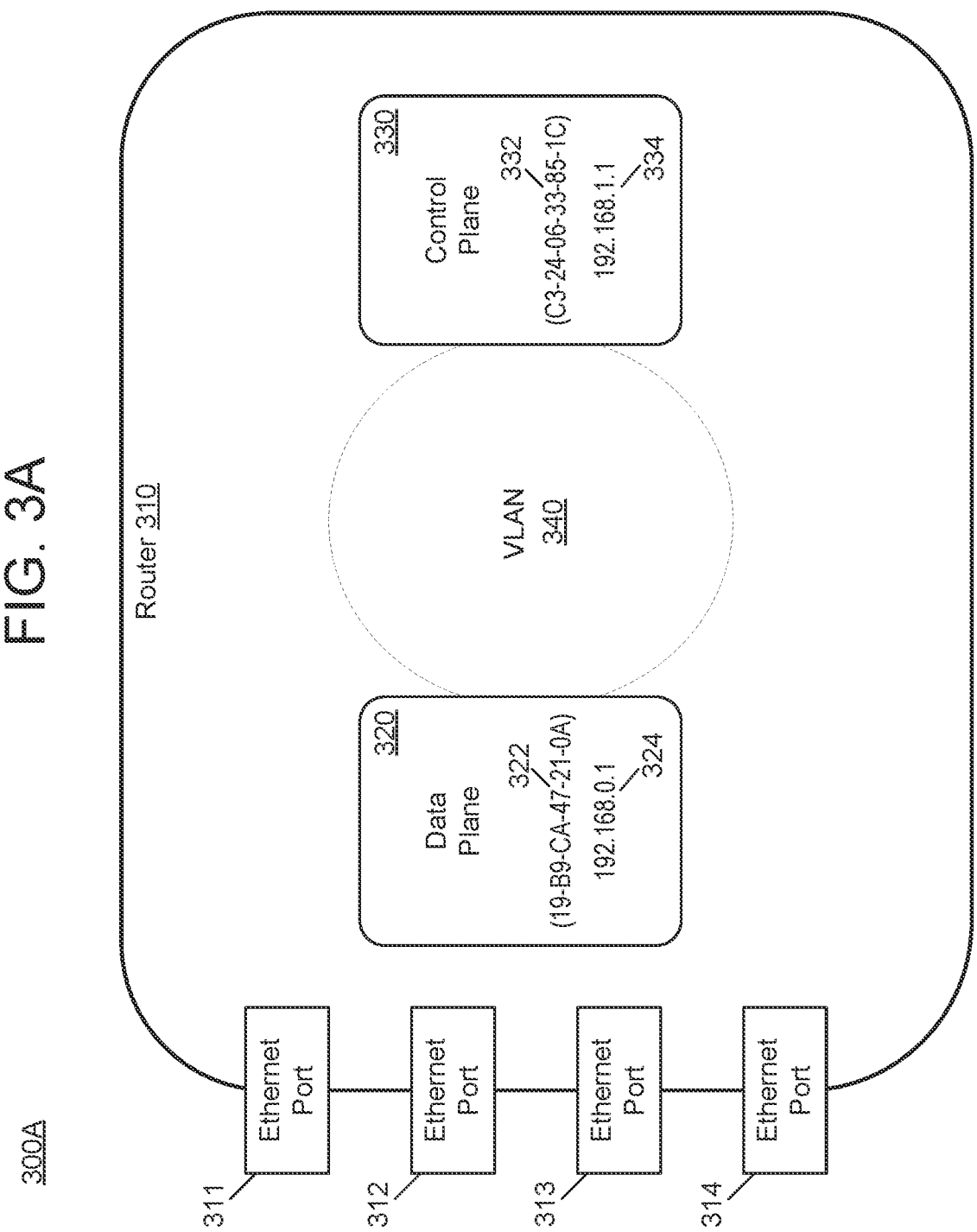

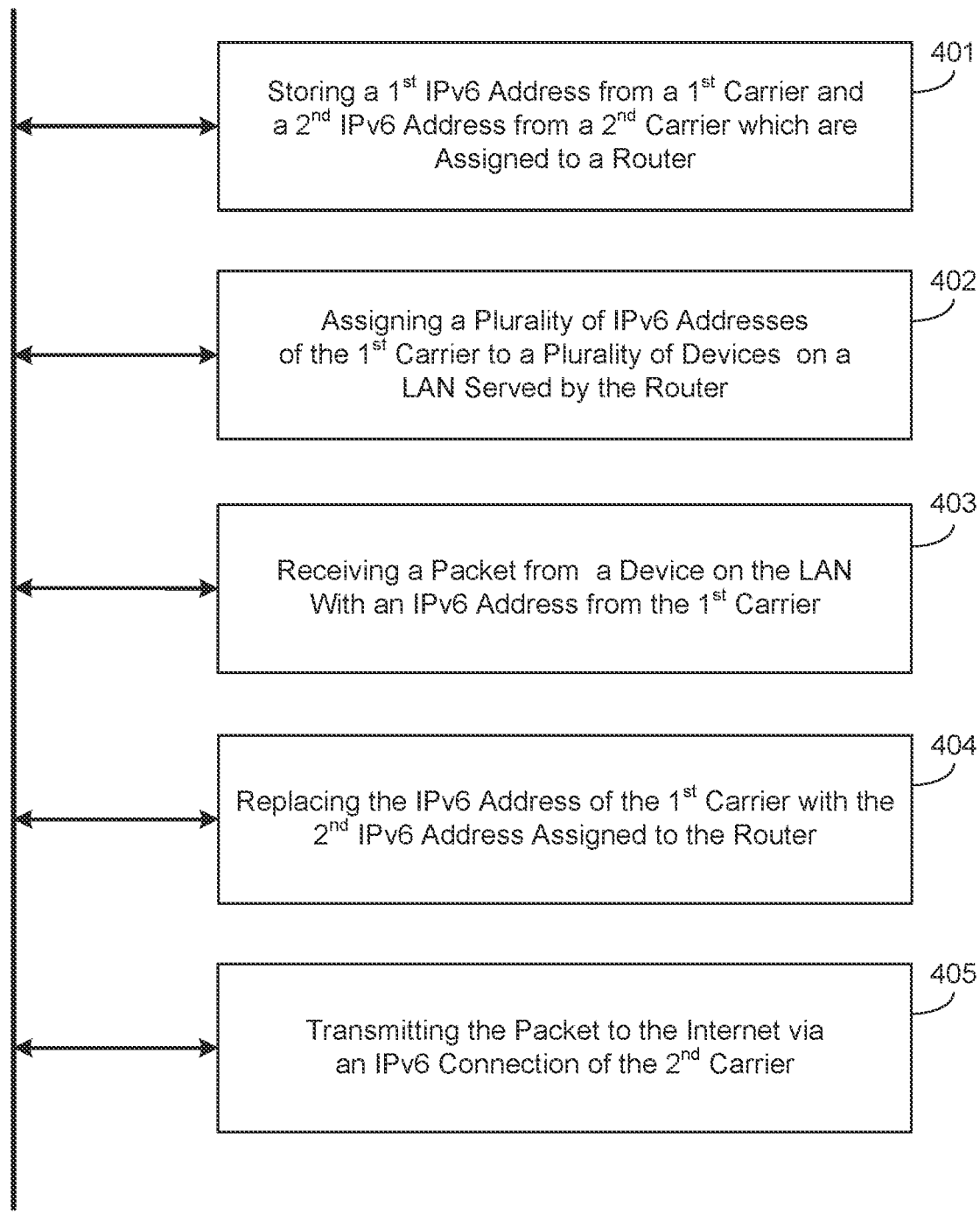

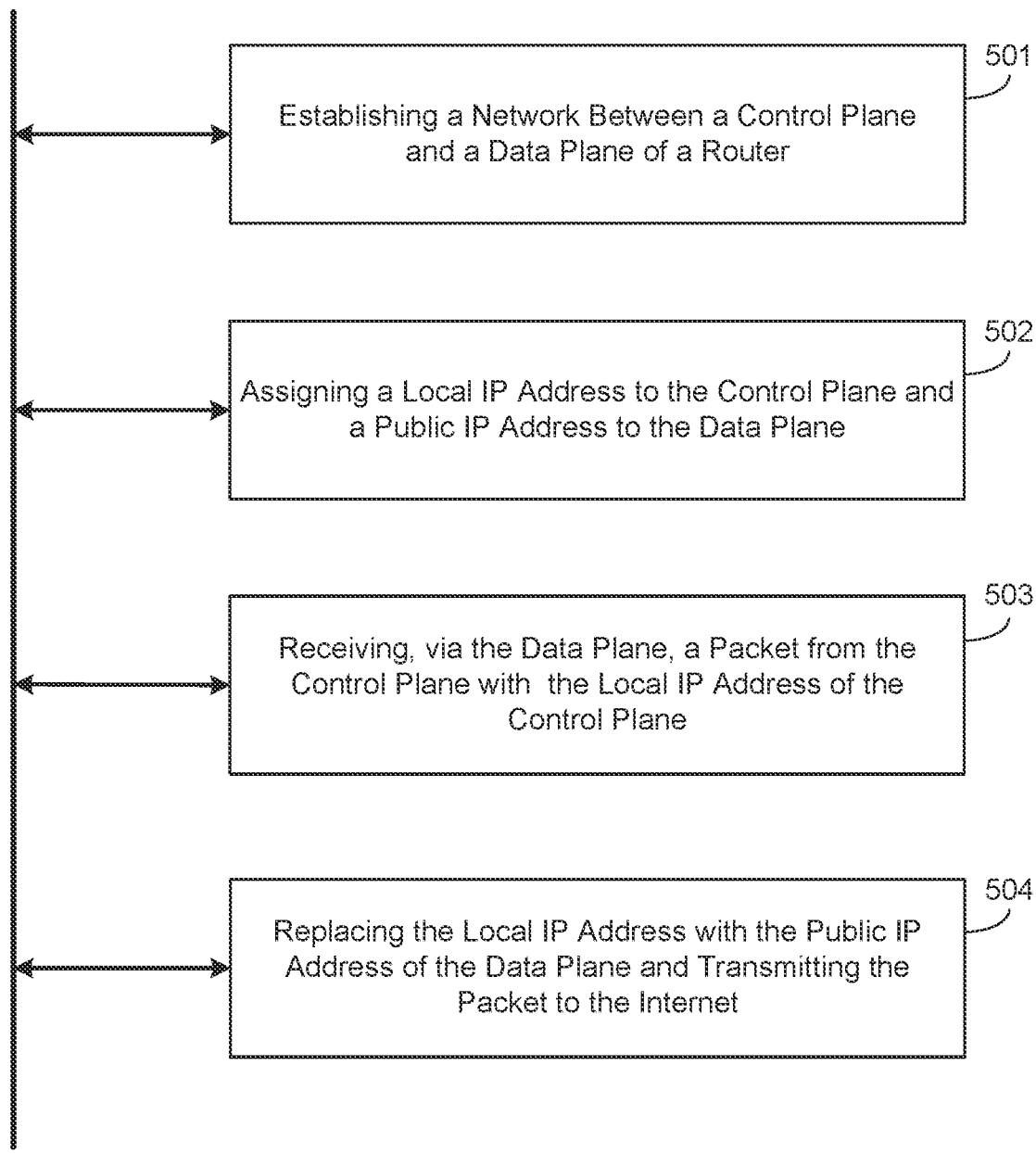

IPV6 ADDRESS TRANSLATION FOR COMPATIBILITY WITH MULTIPLE CARRIERS

BACKGROUND

Network address translation (NAT) is a tool used by Internet Protocol version 4 (IPv4) that allows multiple computers on a local network behind a connection to share a single address of the connection. Here, each computer has a unique address on the local network. Traffic (e.g., a packet) submitted from outside of the network can enter the network through a single address, and a router can translate other data within the packet to identify a local network address of specific device within the local network and distribute the packet to that device. The advent of Internet Protocol version 6 (IPv6) increased the size of an IP address allowing each device to have its own unique IPv6 address. It was thought that IPv6 would obviate the need for NAT. However, certain situations exist in IPv6 where NAT can be useful.

Meanwhile, routers typically use a data plane (routing and forwarding functions) and a kernel stack, or control plane, to manage operations of the router. For example, the data plane may handle the movement of packets (packet routing), VPN services, address management, DHCP, NDP, etc. Meanwhile, the control plane may manage operations such as serving an administrative user interface, downloading firmware updates, connecting to DDNS, etc. Typically, the data plane and the control plane work in conjunction with one another. For example, the data plane may generate a route for a packet, and communicate the route to the control plane. Meanwhile, the control plane may move the packet through the route. However, the interconnection of the data plane (which is available to the public Internet) and the control plane is a potential security concern.

SUMMARY

One example embodiment provides an apparatus that includes one or more of a storage that may store a first Internet Protocol version 6 (IPv6) address of a router assigned by a first carrier and a second IPv6 address of the router assigned by a second carrier, and a processor that may assign a plurality of IPv6 addresses of the first carrier to a plurality of devices on a local area network (LAN) served by the router, receive a packet from a device included on the LAN, where the packet comprises an IPv6 address of the first carrier assigned to the device, replace the IPv6 address of the first carrier within the packet to the second IPv6 address of the router assigned by the second carrier, and transmit the packet to the Internet via an IPv6 connection of the second carrier.

Another example embodiment provides a method that includes one or more of storing a first Internet Protocol version 6 (IPv6) address of a router assigned by a first carrier and a second IPv6 address of the router assigned by a second carrier, assigning a plurality of IPv6 addresses of the first carrier to a plurality of devices on a local area network (LAN) served by the router, receiving a packet from a device included on the LAN, where the packet comprises an IPv6 address of the first carrier assigned to the device, replacing the IPv6 address of the first carrier within the packet to the second IPv6 address of the router assigned by the second carrier, and transmitting the packet to the Internet via an IPv6 connection of the second carrier.

A further example embodiment provides a computer-readable medium comprising instructions, that when read by a processor, cause the processor to perform one or more of storing a first Internet Protocol version 6 (IPv6) address of a router assigned by a first carrier and a second IPv6 address of the router assigned by a second carrier, assigning a plurality of IPv6 addresses of the first carrier to a plurality of devices on a local area network (LAN) served by the router, receiving a packet from a device included on the LAN, where the packet comprises an IPv6 address of the first carrier assigned to the device, replacing the IPv6 address of the first carrier within the packet to the second IPv6 address of the router assigned by the second carrier, and transmitting the packet to the Internet via an IPv6 connection of the second carrier.

BRIEF DESCRIPTION OF THE DRAWINGS

FIGS. 2A-2E are diagrams illustrating a process of translating an IPv6 network address in an environment that includes multiple IPv6 connections of multiple carriers according to example embodiments.

FIGS. 3A-3D are diagrams illustrating a process of isolating a control plane from a data plane during routing and non-routing functions according to example embodiments.

FIG. 4 is a diagram illustrating a method of translating an IPv6 network address according to example embodiments.

FIG. 5 is a diagram illustrating a method of isolating a control plane from a data plane within a router according to example embodiments.

DETAILED DESCRIPTION

Figure 1A:
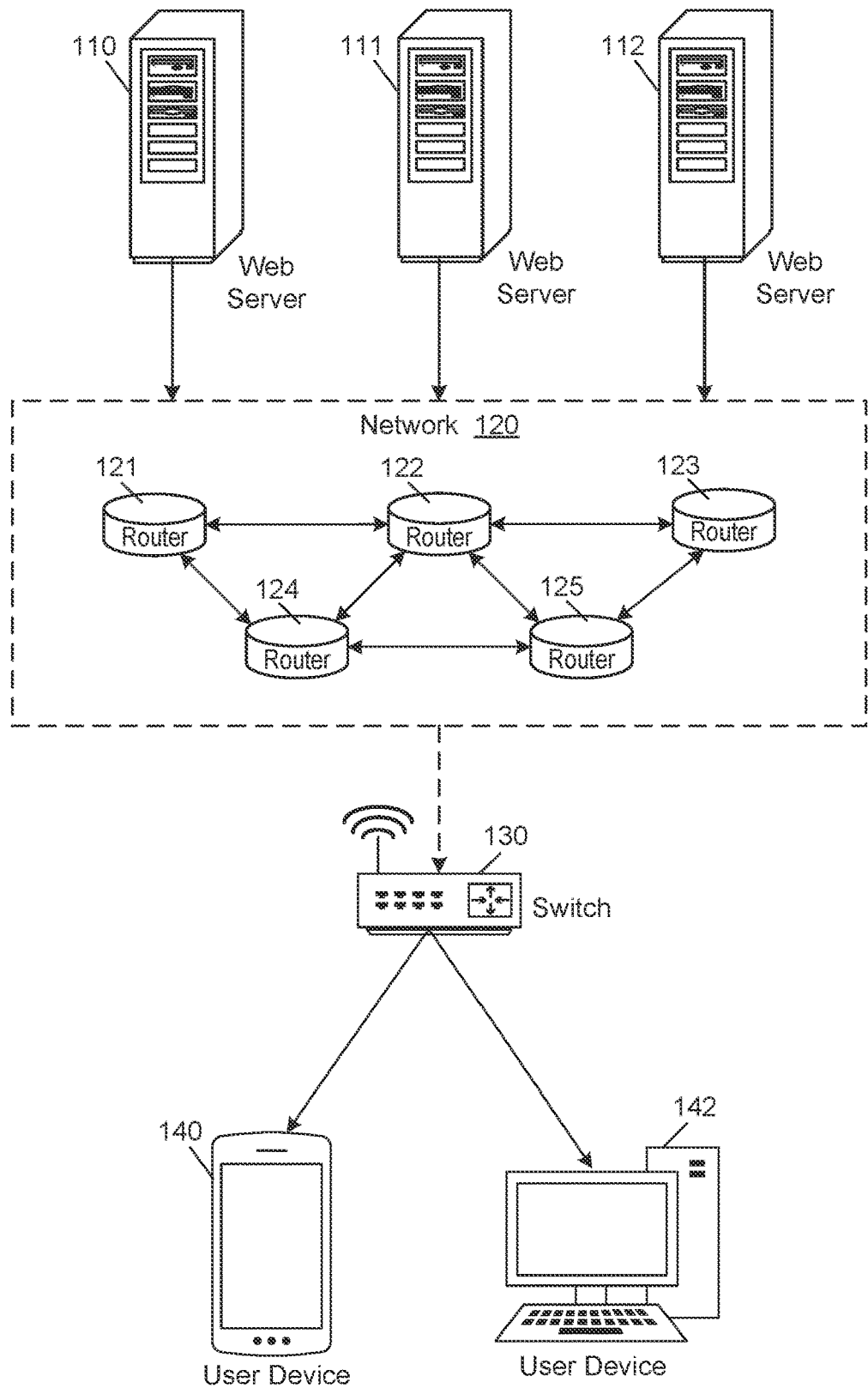
FIG. 1A is a diagram illustrating a network computing environment including a plurality of routing apparatuses according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a routing apparatus (also referred to herein as a router, etc.) The router may be geared for gigabit Internet, and also designed to accommodate future generation speeds. For example, the router may include multiple Ethernet ports that have a 1 Gbps Ethernet capacity or more. The router may enable thousands of connected devices and may collect and store activity data of the connected devices. The router may include a dual-channel memory and may support both Internet Protocol version four (IPv4) which uses a 32-bit address and Internet Protocol version six (IPv6) which uses a 128-bit address. The router can support multiple separate local area networks (LANs) at the same time, may isolate a guest Wireless Fidelity (WiFi) network, and may support multiple virtual LANs (VLANs) with automatic internal mapping. The router may assign each connected device an IP address. The router may perform port forwarding by device name. The router may also support multiple Internet connections for redundancy and load balancing.

The router may include a built-in firewall, and may protect all devices from threat-ware, malware, phishing, ransomware, and viruses. The router may be configured to pause Internet access to any device. Furthermore, the router may be configured to temporarily quarantine a new device when it joins the network. The router may perform content filtering, web search filtering, safe search, intrusion prevention, and the like. The router may also perform automatic virtual private network (VPN) self-configuring, and the like.

According to various embodiments, provided is a network address translation (NAT) process for use with IPv6 addresses. There are thousands of Internet Service Providers (ISPs) that are capable of assigning IPv6 addresses. One of the drawbacks of this arrangement is that the IPv6 addresses of a carrier (i.e., an ISP) are not compatible with IPv6 addresses of other carriers (i.e., other ISPs). In many situations, a router may have multiple internet connections assigned thereto from multiple different carriers. Such an architecture is commonly used for the purpose of redundancy in a network environment, such as an office, a critical infrastructure, and the like. As just one example, redundancy is becoming more popular in the office environment where more and more companies are allowing employees to work virtually/remotely.

When multiple carriers provide IPv6 internet to a router, the router receives multiple IPv6 addresses assigned to it, respectively. Furthermore, the router often receives multiple prefixes from the multiple carriers which enable the router to assign local IPv6 addresses to the devices on a local network served by the router. However, an IPv6 address from a first carrier that is assigned to a network device is not compatible with an IPv6 connection to the Internet provided by a second carrier (different carrier than the first carrier). This is because the second carrier is not aware of the IPv6 address of the first carrier. Routers struggle to manage IPv6 addresses in such a situation, especially when network devices are unaware of which network connection will be used by the router to send their data to the Internet. For example, a router may receive a packet from a network device which includes an IPv6 address of a first carrier. Here, the router may send the packet to the Internet using a network connection of a second carrier. In this case, the IPv6 address of the first carrier is not compatible with the connection of the second carrier and can result in packet loss and other problems. In such a situation, the packet will likely be discarded by the second carrier.

In the example embodiments, a router may perform network address translation (NAT) in when network devices served by the router have multiple IPv6 connections to the Internet. Here, the router may replace an IPv6 address of a network device (assigned by a first carrier) with an IPv6 address of a second carrier (such as the router's IPv6 address assigned by the second carrier, etc.) when transmitting a packet from the first device to the Internet on a connection of the second carrier. In doing so, the router can ensure that the IPv6 address of the packet is compatible with the second carrier thereby ensuring a better chance of delivery.

According to various other embodiments, a router may include both a data plane for performing routing functions and a control plane, also referred to herein as a control plane, for managing non-routing functions. Here, the router may isolate the control plane from the data plane thereby reducing or otherwise preventing the control plane from intrusion from a malicious actor on the Internet. For example, the router may establish a local area network (LAN), such as a virtual local area network (VLAN) between the control plane and the control plane. To do this, the router may assign a public IP address to the data plane and a private IP address to the control plane. The router may also assign separate Media Access Control (MAC) addresses to the data plane and the control plane.

Furthermore, the router can isolate the control plane from directly connecting to the Internet. Rather, when the control plane needs to send a packet outside of the router to the Internet, the control plane is required to submit the packet to the data plane over the VLAN. In response, the VLAN can route the packet from its public IP address to the Internet thereby obfuscating the existence of the control plane from the Internet.

FIG. 1A illustrates a network computing environment 100 including a plurality of routing apparatuses (e.g., routers) according to example embodiments. Referring to FIG. 1A, the network computing environment 100 includes a plurality of web servers that provide content to a plurality of user devices. In this example, a web server 110, a web server 111, and a web server 112 may provide different types of content including emails, videos, chat, social media, video games, and the like, to a user device 140 and a user device 142 via a network of routers 120. In this example, the network of routers 120 includes a router 121, a router 122, a router 123, a router 124, and a router 125. Any of the routers within the network of routers 120 may embody the WIREGUARD® protocol extensions and/or the Layer 3 address management protocols described herein.

For example, the web server 110 may send packets of data to the user device 140 via the network of routers 120. In this example, one or more of the routers in the network of routers 120 may receive and route the packets until it reaches the user device 140. For example, a router 121 may receive the packets from the web server 110 and route the packets to the router 124. Here, the router 121 may select/choose the best path for the packets through the network. In response to receiving the packets, the router 124 may then route the packets to a switch 130, which then delivers the packets to the user device 140. The source and destination of the packets may be included in the packets and may be used by the network of routers 120 and the switch 130 to deliver the packet to the appropriate device (the user device 140).

Each of the routers in the network of routers 120 may store a routing table which includes all of the available paths in the network of routers 120. A router may look at the destination IP address in the packet and determine the fastest path through the network of routers 120 based on the routing table and metric values determined by the router. Furthermore, any of the routers within the network of routers 120 may perform the methods and processes described herein. For example, a router may automatically configure a VLAN interface, may enable direct access to a remote device, and/or may transparently replace an existing router on the network without a need for manual configuration.

The example of FIG. 1A could refer to a home environment or the like. It should also be appreciated that the routers described herein may be used in an office environment. In this example, the routers may connect not only user devices, but also other servers, and the like.

Figure 1B:
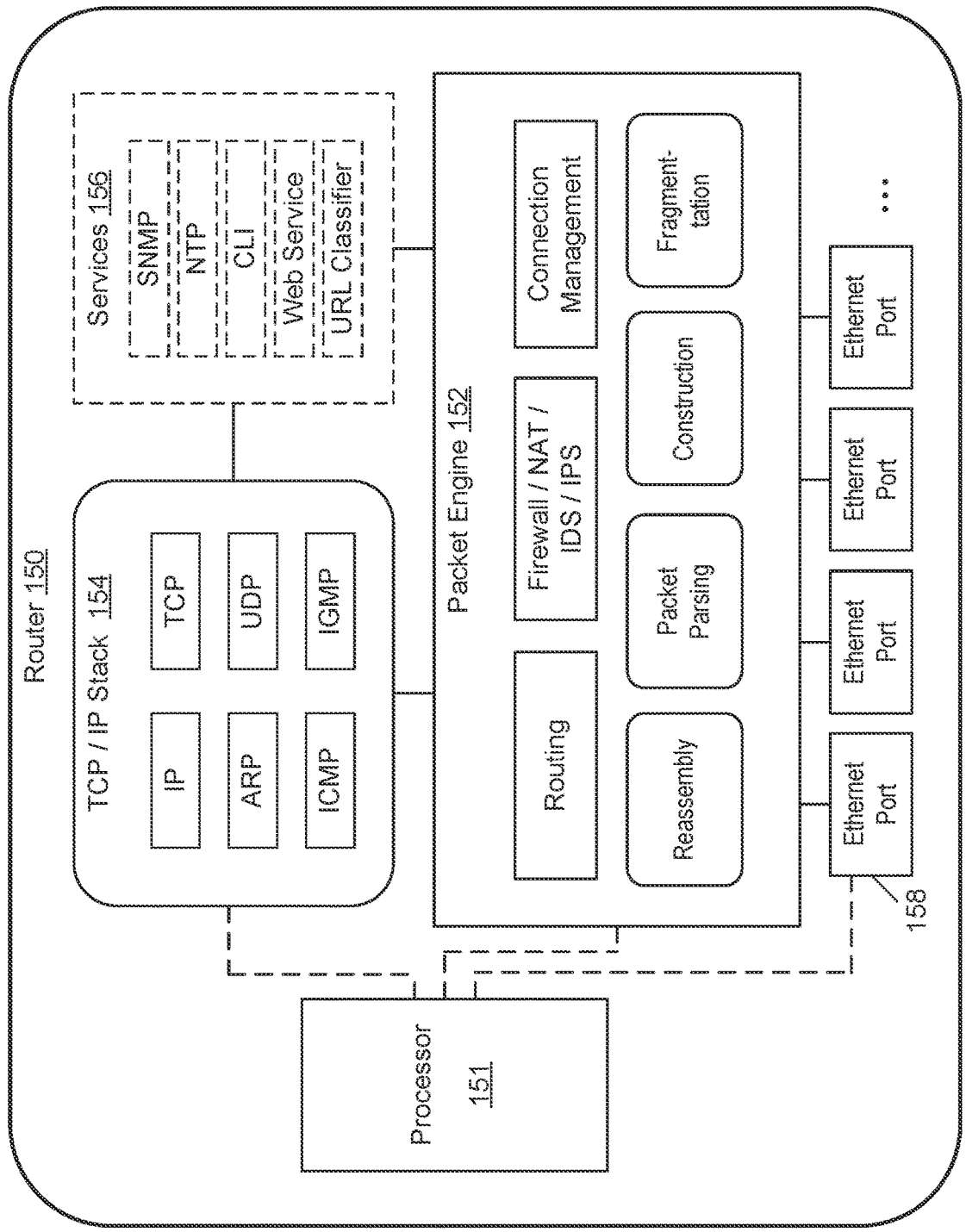
FIG. 1B is a diagram illustrating components that may be included in a routing apparatus according to example embodiments.

FIG. 1B illustrates components that may be included within a routing apparatus (i.e., a router 150) according to example embodiments. Referring to FIG. 1B, the router 150 includes a processor 151 such as a central processing unit (CPU) that helps each of the other components of the router 150 perform their function. The router 150 also includes a packet engine 152, a transmission protocol/Internet protocol (TCP/IP) stack 154, and a plurality of Ethernet ports 158. In this example, the packet engine 152 is responsible for processing packets as they are received through an ingress port (e.g., an Ethernet port 158) and output via an egress port. The TCP/IP stack 154 is responsible for ensuring that various protocols are enforced on packets from ingress to egress. The packet engine 152 and/or the TCP/IP Stack 154 may perform services 156 on packets that pass through the router 150 including, but not limited to, implementing a Simple Network Management Protocol (SNMP), implementing Network Time Protocol (NTP), providing and managing a command line interface (CLI), managing a web service that is accessible to external devices, and a uniform resource locator (URL) classifier.

According to various embodiments, the packet engine 152 may perform routing on a packet based on a destination IP address of the packet, may implement a firewall, perform network address translation (NAT), perform an intrusion detection system (IDS), perform an intrusion prevention system (IPS), and the like. The packet engine 152 may also perform a connection management function to control automatic failover, monitor client connections, direct requests to appropriate servers, act as a proxy server, handle client/server communications, and prioritize connections between application servers. The packet engine 152 may also perform reassembly on fragments of a packet as it arrives and apply ACLs and NATs to the packet once it is reassembled, packet parsing, construction, and fragmentation of packets into smaller pieces so that resulting pieces can pass through a link with a smaller maximum transmission unit.

In some embodiments, the packet engine 152 may also manage autoconfiguration for IPv4 which enables devices to connect to the Internet automatically assign themselves an IP address, device management which displays views of router configuration and performance such as to an external device, virtual private networks (VPNs), routing information protocol (RIP), Universal Plug and Play (UPnP) to enable compliant devices to automatically set port forwarding rules, simple service discovery protocol (SSDP) which enables a device to advertise its services to other devices, a Domain Name System (DNS) which enables translation of domain names to machine-readable IP addresses, a hostname cache which can be used by the DNS store hostnames and IP address pairings, category enforcement which enables blocking of categories of DNS, device pause, and the like.

Furthermore, the packet engine 152 may also control and manage dynamic host configuration protocol (DHCP) including DHCP client and DHCP server functions. DHCP can be used to assign IP addresses to DHCP clients and allocate TCP/IP configuration information to DHCP clients. This information includes subnet mask information, default gateway IP addresses, and DNS addresses. In some embodiments, the router 150 may serve as a DHCP server that assigns IP addresses to clients connected to the router 150.

In one embodiment, the system integrates a dynamic load-balancing mechanism into a router apparatus. The system utilizes components such as a processor, packet engine, and TCP/IP stack to optimize real-time network traffic distribution. The router continuously monitors the traffic load across different network paths by analyzing incoming packets. Upon detecting congestion on a specific route, the packet engine evaluates the severity of congestion based on metrics like packet loss, latency, and throughput. The packet engine triggers a message to the TCP/IP stack indicating the need for rerouting. The message contains detailed information about the congested route, such as current traffic load and performance metrics. Upon receiving the message, the TCP/IP stack engages in dynamic route recalibration. It consults a routing algorithm that considers factors like network topology, link bandwidth, and quality of service requirements. The algorithm computes alternative routes that offer better performance and lower congestion levels. The TCP/IP stack then updates the routing table accordingly, redirecting traffic away from congested paths towards more optimal routes. Conversely, when congestion alleviates on a route, the router sends another message to the TCP/IP stack to readjust routing decisions, optimizing network performance. The router leverages historical traffic data and predictive analytics. The router anticipates congestion hotspots by analyzing past traffic patterns and predicting future demand, and proactively adjusts routing decisions to prevent bottlenecks. Machine learning algorithms are also employed to continuously refine and improve the predictive models based on real-world network behavior.

In one embodiment, an apparatus enables efficient routing of network traffic between devices on a local area network and the Internet via distinct carrier connections. The apparatus includes a storage component configured to store essential data. The storage component stores the IPv6 address of the router assigned by the first carrier and the IPv6 address of the router assigned by the second carrier. The apparatus features a processor that assigns multiple IPv6 addresses (belonging to the first carrier) to various devices within the local area network (LAN) served by the router. This process ensures that each device on the LAN has a unique IPv6 address assigned from the pool provided by the first carrier. Upon receiving a packet from a device connected to the LAN, the processor analyses the packet, identifying the IPv6 address assigned to the device by the first carrier. After identifying the IPv6 address within the packet, which corresponds to the first carrier, the processor replaces the address with the second IPv6 address of the router. This replacement ensures that outgoing packets from devices within the LAN appear to originate from the router's second IPv6 address, assigned by the second carrier. Once the address replacement is complete, the processor forwards the packet for transmission to the Internet. It utilizes the IPv6 connection provided by the second carrier for this transmission.

FIGS. 2A-2E illustrate a process of translating an IPv6 network address in an environment that includes multiple IPv6 connections of multiple carriers according to example embodiments. In the examples of FIGS. 2A-2E, multiple carriers (i.e., Internet Service Providers) have provided multiple IPv6 addresses to a router. In response, the router assigns multiple IPv6 addresses (e.g., one for each carrier, etc.) to each network device that is served by the router. However, because the router has multiple Internet connections available, the network devices may use an IPv6 address of a different carrier when transmitting a packet to the Internet through the router. In the example embodiments, the router may perform a network address translation (NAT) for IPv6 by replacing an IPv6 address of a network device (of a $1^{st}$ carrier) with an IPv^6 address of a second carrier, when transmitting a packet for the network device across a network connection of the second carrier. In doing so, the router can prevent the packet from being sent with an incompatible IPv6 address.

Figure 2A:
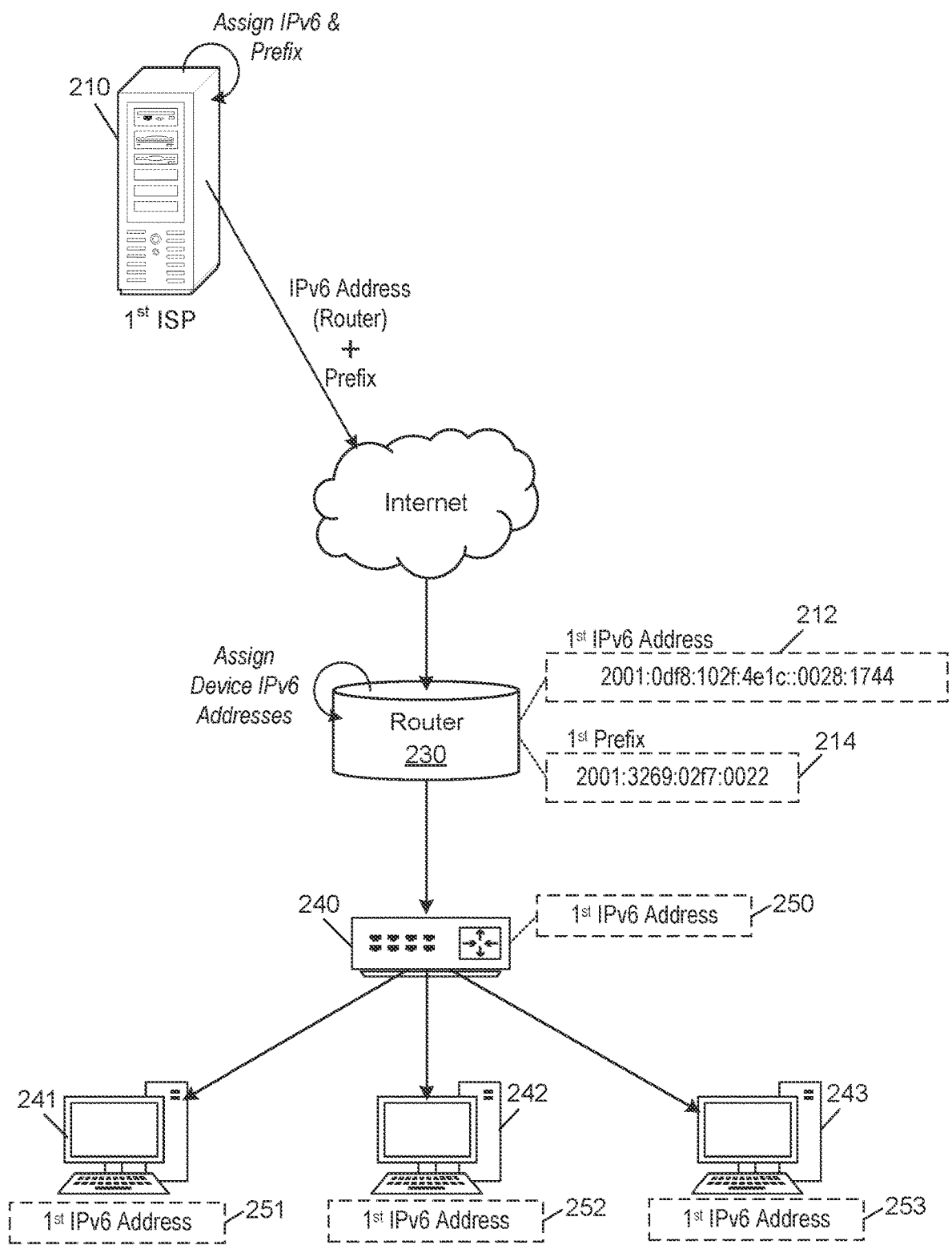

FIG. 2A illustrates a process 200A of an IPv6 address assignment process between a first carrier 210 and a router 230 according to example embodiments. Referring to FIG. 2A, the router 230 serves a plurality of network devices on a local area network including a switch 240, a network device 241, a network device 242, and a network device 243. Here, the first carrier 210, such as a first Internet Service Provider, may assign a first IPv6 address 212 to the router 230. In addition, the first carrier 210 may also assign a first prefix 214 to the router 230. In this example, the router 230 may use the first prefix 214 to generate individual IPv6 addresses of the first carrier 210 for each of the network devices including a first IPv6 address 250 for the switch 240, a first IPv6 address 251 for the network device 241, a first IPv6 address 252 for the network device 242, and a first IPv6 address 253 for the network device 243.

Each of the first IPv6 address 212 assigned to the router 230, the first IPv6 address 250 assigned to the switch 240, the first IPv6 address 251 assigned the network device 241, the first IPv6 address 252 assigned the network device 242, and the first IPv6 address 253 assigned the network device 243, are compatible with a network connection of the first carrier 210. Here, the network connection may be assigned to a port of the router 230. For example, FIG. 2C illustrates a detailed view 200C of the router 230 including a plurality of network connection ports, for example, an Ethernet port 231, an Ethernet port 232, an Ethernet port 233, and an Ethernet port 234. In this example, the first IPv6 address 212 assigned to the router 230 by the first carrier 210 is attached to an Ethernet port 231 of the router 230.

According to various embodiments, network devices such as routers may use multiple Internet connections, from multiple different providers, for purposes of redundancy, and for other reasons such as load balancing. In the example embodiments, the router may include a second Internet connection provided by a second Internet Service Provider.

For example, FIG. 2B illustrates a process 200B of an IPv6 address assignment process between a second carrier 220 and the router 230 according to example embodiments. Referring to FIG. 2B, the second carrier 220, such as a second Internet Service Provider, may assign a second IPv6 address 222 to the router 230. Here, the router 230 may include a storage such as a table that stores the different IPv6 addresses assigned to the router. In addition, the second carrier 220 may also assign a second prefix 224 to the router 230. In this example, the router 230 may use the second prefix 224 to generate individual IPv6 addresses of the second carrier 220 for each of the network devices including a second IPv6 address 260 for the switch 240, a second IPv6 address 261 for the network device 241, a second IPv6 address 262 for the network device 242, and a second IPv6 address 263 for the network device 243. The router 230 may also store identifiers of the IPv6 addresses assigned to the network devices from both carriers within the storage of the router 230.

Each of the second IPv6 address 222 assigned to the router 230, the second IPv6 address 260 assigned to the switch 240, the second IPv6 address 261 assigned the network device 241, the second IPv6 address 262 assigned the network device 242, and the second IPv6 address 263 assigned the network device 243, are compatible with a network connection of the second carrier 220, while also not being compatible with the network connection of the first carrier 210. Meanwhile, each of the first IPv6 address 212 assigned to the router 230, the first IPv6 address 250 assigned to the switch 240, the first IPv6 address 251 assigned the network device 241, the first IPv6 address 252 assigned the network device 242, and the first IPv6 address 253 assigned the network device 243, are not compatible with a network connection of the second carrier 220.

The router 230 may assign the network connection of the second carrier to a different port of the router 230. For example, referring to FIG. 2C, the router 230 may assign the second IPv6 address from the second carrier 220 to the Ethernet port 232. Thus, multiple Internet connections from multiple different carriers are present at the router 230. However, the network devices may be unaware of which Internet connection (of which carrier) is going to be used to connect to the Internet.

Figure 2D:
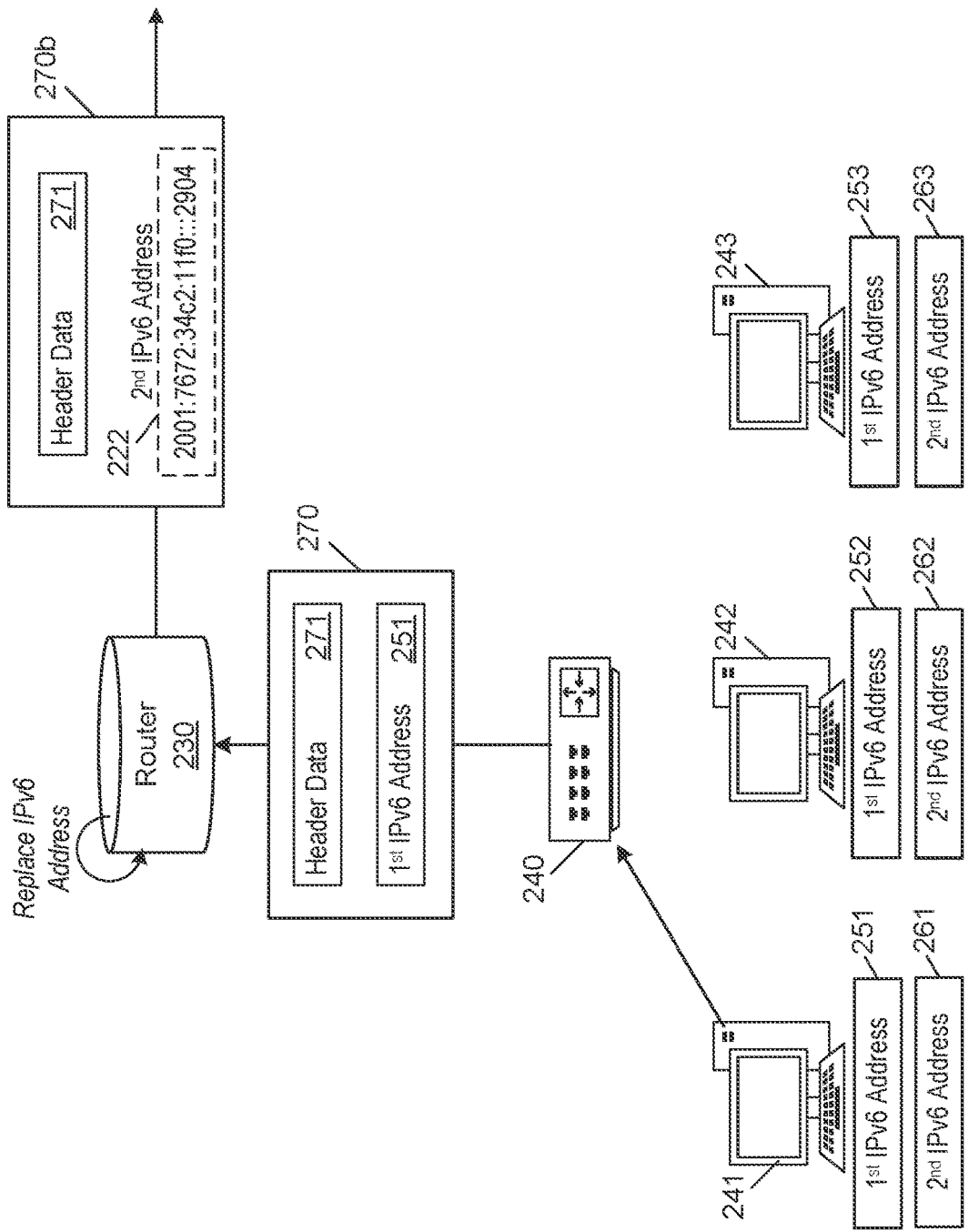

FIG. 2D illustrates an address translation process 200D for a packet 270 sent from the network device 241 to the Internet. Referring to FIG. 2D, the network device 241 may generate a packet with a payload (not shown) that is to be sent to a destination on the Internet. Here, the network device 241 may add the first IPv6 address 251 of the first carrier 210 to the packet 270 and transmit the packet 270 to the router 230 via the switch 240. In this example, the router 230 may use a network connection of the second carrier 220 to transmit the packet 270 to the Internet, but the first IPv6 address 251 of the network device 241 is not compatible with the second carrier 220.

According to various embodiments, the router 230 may replace the first IPv6 address 251 of the network device 241 with the second IPv6 address 222 of the router 230 within the packet 270 to generate a modified packet 270b. In this example, the second IPv6 address 222 is compatible with the second carrier 220. The modified packet 270b may still include identifiable information of the network device 241 within a header 271 of the modified packet 270b which may include a port number, a source address, a MAC address, or the like. Accordingly, the modified packet 270b may successfully reach the destination on the Internet with the modified IPv6 address.

FIG. 2E illustrates an address translation process 200E for a packet 280 received from another device outside of the local area network via the Internet. Referring to FIG. 2E, the router 230 receives the packet 280 from the Internet via a network connection of the first carrier 210. Here, the packet 280 includes the IPv6 address 222 of the router 230 as a destination address. However, the router 230 can analyze header data 282 within the packet 280 and determine that the packet 280 is actually destined for the network device 241. In response, the router 230 can add the second IPv6 address 261 of the network device 241 to the packet 280 to generate a modified packet 280b. The modified packet 280b can be routed to the network device 241 via the switch 240.

Figure 3B:
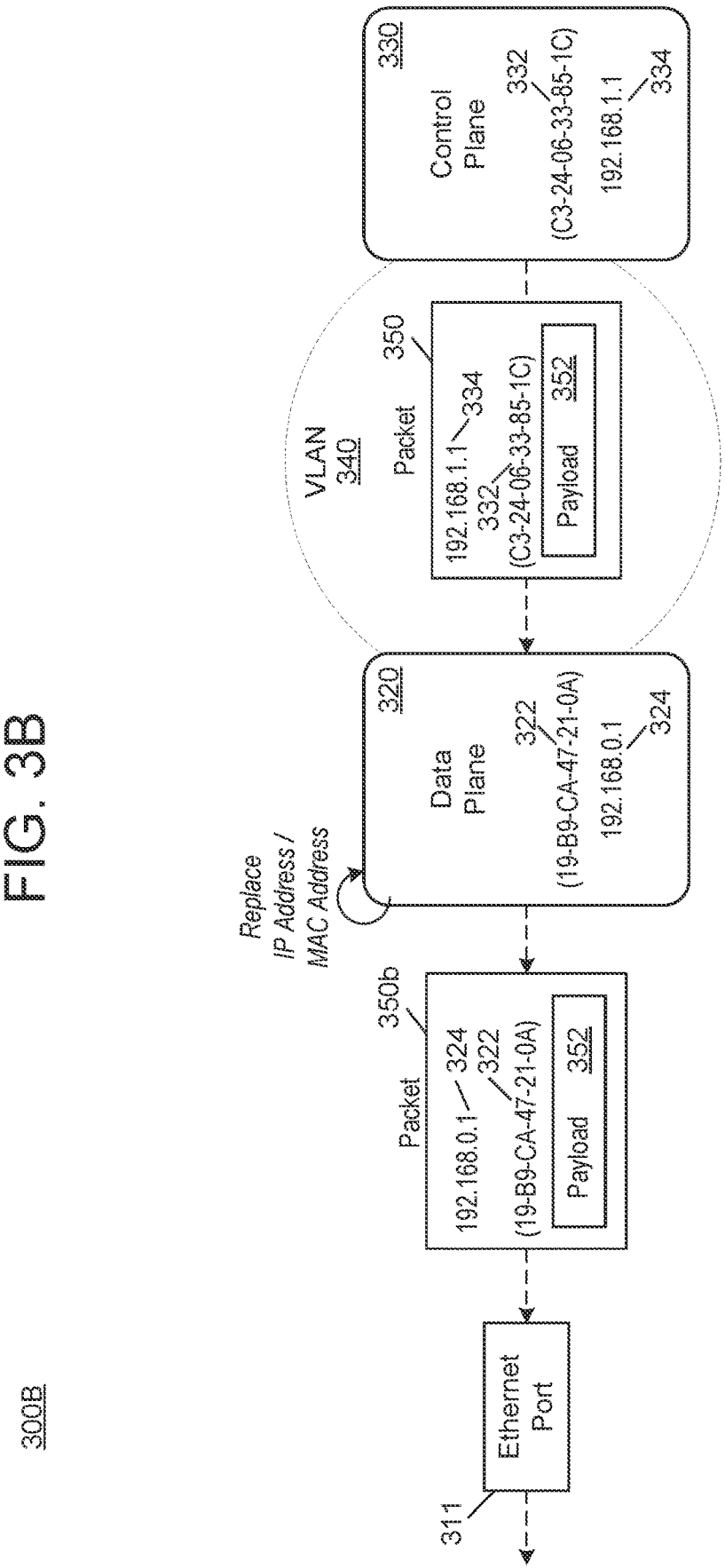

FIGS. 3A-3D illustrate a process of isolating a control plane from a data plane during routing and non-routing functions according to example embodiments. For example, FIG. 3A illustrates a process 300A of generating a local area network between a control plane 320 and a control plane 330 within a router 310. In this example, the router 310 includes a plurality of network ports including an Ethernet port 311, an Ethernet port 312, an Ethernet port 313, and an Ethernet port 314 for routing traffic to a network such as a local area network, the Internet, a virtual private network (VPN), and the like. In this example, the router 310 may also include a processor (not shown) which is capable of performing any of the steps described herein.

Referring to FIG. 3A, the control plane 320 may perform routing functions of the router 310 including, but not limited to, establishing a network topology, managing a routing table that defines what to do with incoming packets, load balancing, and the like. The data plane 320 represents the routing process performed by the router. Although not shown in FIG. 3A, the data plane 320 may be managed by a processing device of the router 310. Meanwhile, the control plane 330 refers to the non-routing functions of the router 310 including, but not limited to, supporting a graphical user interface (GUI), supporting a web application, downloading firmware updates, connecting to DDNS services to update IP addresses, URL categorization lookups via cloud services, and the like.

In the example embodiments, the data plane 330 may be logically isolated from the data plane 320 through an internal network of the router 310. In this example, the data plane 320 may establish a virtual local area network (VLAN) 340 between the data plane 320 and the control plane 330. In this example, the VLAN 340 only includes only two network participants (i.e., the data plane 320 and the control plane 330). Here, the data plane 320 may assign the control plane 330 a local IP address 334 and a local MAC address 332 which are different from a public IP address 324 and a MAC address 322 of the data plane. Communications between the data plane 320 and the control plane 330 may be limited/restricted to the VLAN 340. Thus, the control plane 330 may be isolated from routing functions performed by the control plane 320.

In the example embodiments, the control plane 330 may communicate with devices on a network such as the Internet through the VLAN 340. For example, FIG. 3B illustrates a process 300B of the control plane 330 submitting a packet 350 to the data plane 320 which is destined for the Internet. Here, the kernel stack 330 uses the local IP address 334 (and the local MAC address 332) within the packet 350. The packet 350 may also include a payload 352 and destination information (not shown).

In response, the control plane 320 may replace the local IP address 334 of the control plane 330 with the public IP address 324 of the data plane 320. Also, the data plane 320 may replace the local MAC address 332 of the control plane 330 with the MAC address 322 of the data plane 320. The result is a modified packet 350b. The data plane 320 may then send the modified packet 350b to a destination on the Internet. For example, the data plane 320 may send the modified packet 350b to the Internet via the Ethernet port 311 of the router 310.

Figure 3C:
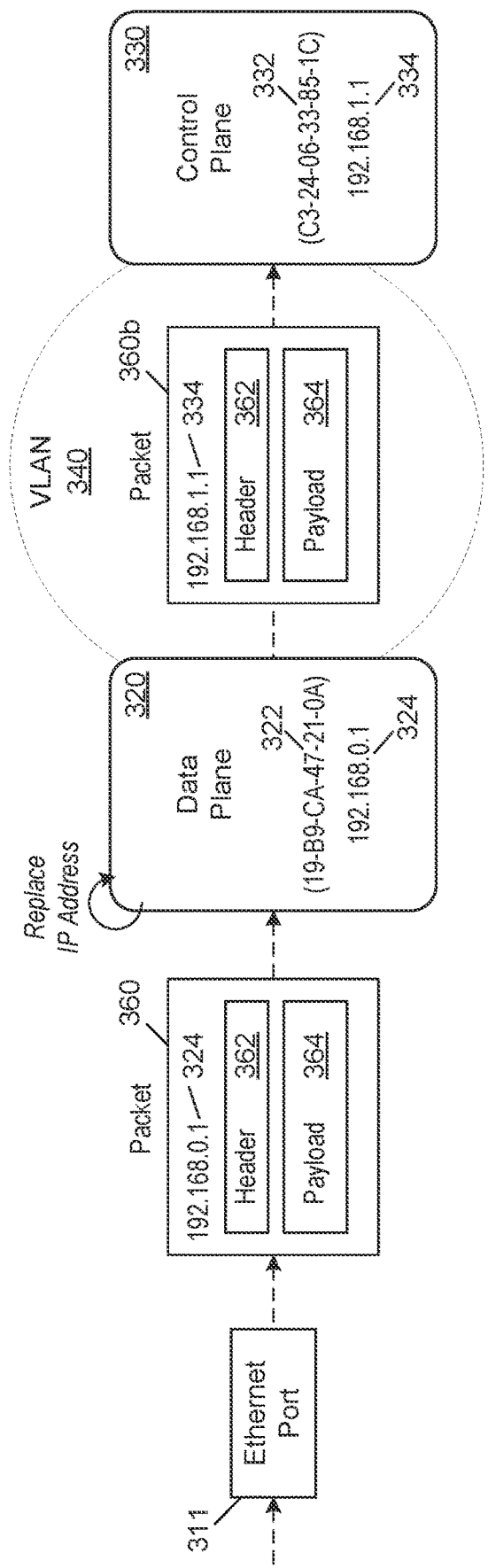

FIG. 3C illustrates a process 300C of a packet being transmitted to the control plane 330, such as a return packet to the modified packet 350b transmitted in FIG. 3B. Referring to FIG. 3C, the data plane 320 may receive a packet 360 from the Internet. The packet 360 may include the public IP address 324 of the data plane 320. Here, the data plane 320 may analyze a header 362 of the packet 360 and/or a payload 364 of the packet 360 and determine that the packet 360 is destined for the control plane 330. For example, a destination number/port number may be used to identify that the packet is destined for the control plane 330. In response, the data plane 320 may replace the public IP address 324 of the data plane 320 with the local IP address 334 of the kernel stack 330 to generate a modified packet 360b. The data plane 320 may transmit the modified packet 360b to the kernel stack 330 via the VLAN 340.

Figure 3D:
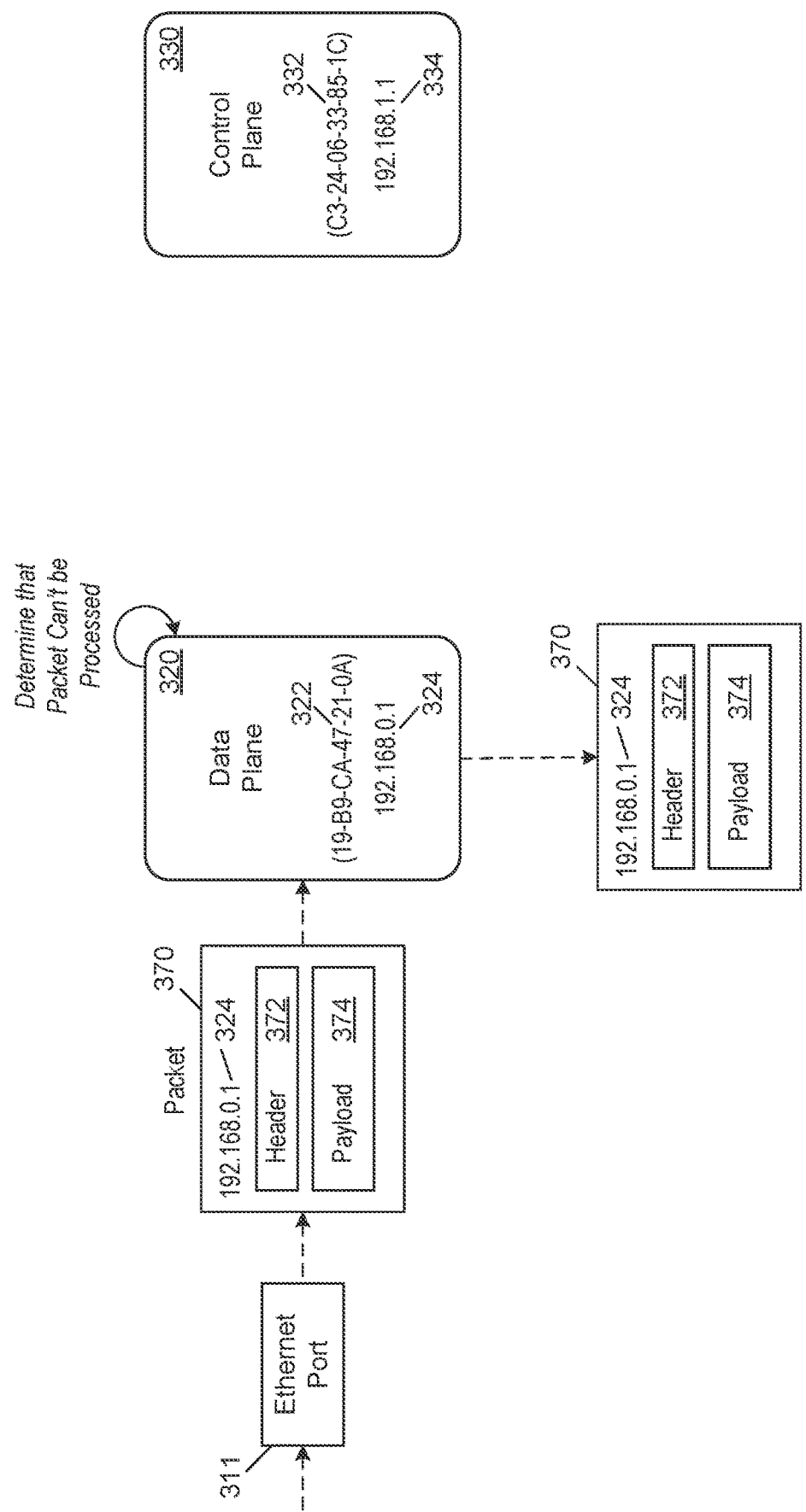

With the kernel stack 330 isolated from the data plane 320, the data plane 320 can perform routing functions without accessing/consulting the kernel stack 330. For example, FIG. 3D illustrates a process 300D of discarding a packet 370 without consulting the kernel stack 330. Here, the packet 370 includes the public IP address 324 of the data plane 320. The data plane 320 receives the packet 370 and analyzes the header 372 and/or the payload 374 and determines that the packet 370 cannot be processed. In this example, the data plane 320 discards the packet 370 without accessing the kernel stack 330.

FIG. 4 illustrates a method 400 of translating an IPv6 network address according to example embodiments. For example, the method 400 may be performed by a router shown in any of the examples herein. Referring to FIG. 4, in 401, the method may include storing a first Internet Protocol version 6 (IPv6) address of a router assigned by a first carrier and a second IPv6 address of the router assigned by a second carrier. In 402, the method may include assigning a plurality of IPv6 addresses of the first carrier to a plurality of devices on a local area network (LAN) served by the router. In 403, the method may include receiving a packet from a device included on the LAN, where the packet comprises an IPv6 address of the first carrier assigned to the device. In 404, the method may include replacing the IPv6 address of the first carrier within the packet to the second IPv6 address of the router assigned by the second carrier. In 405, the method may include transmitting the packet to the Internet via an IPv6 connection of the second carrier.

In the example embodiments, the plurality of IPv6 addresses of the first carrier assigned to the plurality of devices on the LAN served by the router are not compatible with the second carrier. In some embodiments, the method may further include receiving a return packet from the IPv6 connection of the second carrier, wherein the return packet comprises the second IPv6 address of the router assigned by the second carrier. In some embodiments, the method may further include identifying the device from a source address of the device included in a header of the return packet and transmitting the return packet to the device via the LAN.

In some embodiments, the method may further include assigning a second set of IPv6 addresses of the second carrier to the plurality of devices, respectively. In some embodiments, the method may further include receiving a second packet from a second device included on the LAN, where the second packet comprises an IPv6 address of the second carrier assigned to the second device, replacing the IPv6 address of the second carrier within the second packet to the first IPv6 address of the router assigned by the first carrier, and transmitting the second packet via an IPv6 connection of the first carrier. In some embodiments, the method may further include detecting that multiple IPv6 connections exist to the Internet prior to replacing the IPv6 address of the first carrier based on more than one default IPv6 route stored by the router.

FIG. 5 illustrates a method 500 of isolating a kernel stack from a data plane within a router according to example embodiments. For example, the method 500 may be performed by a router shown in any of the examples herein, or any other Internet-connected device such as a switch, hub, etc. Referring to FIG. 5, in 501, the method may include establishing a network between a kernel stack configured to control non-routing functions and a data plane configured to control routing functions. In some embodiments, the kernel stack may be referred to as a data plane, etc.

In 502, the method may include assigning a private Internet Protocol (IP) address to the kernel stack and a public IP address to the data plane. In 503, the method may include receiving, via the data plane, a packet from the kernel stack via the network, where the packet includes the private IP address of the kernel stack. In 504, the method may include replacing, via the data plane, the private IP address of the kernel stack in the packet with the public IP address of the data plane and transmitting the packet to the Internet.

In some embodiments, the establishing may include establishing a virtual local area network (VLAN) between the kernel stack and the data plane based on the private IP address and the public IP address. In some embodiments, the VLAN may include the data plane and the kernel stack, only. In some embodiments, the method may further include receiving, via the data plane, a packet from a network device via a local area network (LAN) and forwarding the packet to another network device without accessing the kernel stack.

In some embodiments, the method may further include receiving a packet from a network device, via the data plane, determining that the packet cannot be processed, and dropping the packet without consulting the kernel stack. In some embodiments, the method may further include transmitting, via the kernel stack, a packet with a destination address of an external device to the public IP address of the data plane and transmitting the packet to the destination address of the external device via the data plane. In some embodiments, the method may further include receiving, via the data plane, a response packet from a device via the Internet, determining that the response packet is destined for the control plane based on a header of the response packet, and transmitting the response packet to the control plane via the network.

The above embodiments may be implemented in hardware, in a computer program executed by a processor, in firmware, or in a combination of the above. A computer program may be embodied on a non-transitory computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of at least one of an apparatus, a method, and a computer-readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the capabilities of the routing apparatus shown and described with respect to various figures can be performed by one or more processors of the routing apparatus, or other components.

One skilled in the art will appreciate that a "system" could be embodied as a personal computer, a server, a console, a personal digital assistant (PDA), a cell phone, a tablet computing device, a smartphone, a smart-wearable device, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus, comprising:
   a storage configured to store a first Internet Protocol version 6 (IPv6) address of a router assigned by a first carrier and a second IPv6 address of the router assigned by a second carrier; and
   a processor configured to
   assign a plurality first set of IPv6 addresses of the first carrier and a second set of IPv6 address of the second carrier to a plurality of devices on a local area network (LAN) served by the router,
   receive a packet from a device included on the LAN, where the packet comprises an IPv6 address of the first carrier assigned to the device,
   replace the IPv6 address of the first carrier within the packet to the second IPv6 address of the router assigned by the second carrier, transmit the packet to the Internet via an IPv6 connection of the second carrier,
receive a second packet from a second device on the LAN, where the second packet comprises an IPv6 address of the second carrier assigned to the second device, and
replace the IPv6 address of the second carrier within the second packet to the first IPv6 address of the router assigned by the first carrier, and transmit the second packet via an IPv6 connection of the first carrier.

2. The apparatus of claim 1, wherein the plurality first set of IPv6 addresses of the first carrier assigned to the plurality of devices on the LAN served by the router are not compatible with the second carrier.

3. The apparatus of claim 1, wherein the processor is configured to receive a return packet from the IPv6 connection of the second carrier, wherein the return packet comprises the second IPv6 address of the router assigned by the second carrier.

4. The apparatus of claim 3, wherein the processor is further configured to identify the device from a source address of the device included in a header of the return packet and transmit the return packet to the device via the LAN.

5. The apparatus of claim 1, wherein the processor is further configured to detect that multiple IPv6 connections exist to the Internet prior to replacing the IPv6 address of the first carrier based on more than one default IPv6 route stored in the storage.

6. A method, comprising:
storing a first Internet Protocol version 6 (IPv6) address of a router assigned by a first carrier and a second IPv6 address of the router assigned by a second carrier;
assigning a plurality first set of IPv6 addresses of the first carrier and a second set of IPv6 addresses of the second carrier to a plurality of devices on a local area network (LAN) served by the router;
receiving a packet from a device included on the LAN, where the packet comprises an IPv6 address of the first carrier assigned to the device;
replacing the IPv6 address of the first carrier within the packet to the second IPv6 address of the router assigned by the second carrier;
transmitting the packet to the Internet via an IPv6 connection of the second carrier;
receiving a second packet from a second device on the LAN, where the second packet comprises an IPv6 address of the second carrier assigned to the second device; and
replacing the IPv6 address of the second carrier within the second packet to the first IPv6 address of the router assigned by the first carrier, and transmitting the second packet via an IPv6 connection of the first carrier.

7. The method of claim 6, wherein the plurality of IPv6 addresses of the first carrier assigned to the plurality of devices on the LAN served by the router are not compatible with the second carrier.

8. The method of claim 6, wherein the method further comprises receiving a return packet from the IPv6 connection of the second carrier, wherein the return packet comprises the second IPv6 address of the router assigned by the second carrier.

9. The method of claim 8, wherein the method further comprises identifying the device from a source address of the device included in a header of the return packet and transmitting the return packet to the device via the LAN.

10. The method of claim 6, wherein the method further comprises detecting that multiple IPv6 connections exist to the Internet prior to replacing the IPv6 address of the first carrier based on more than one default IPv6 route stored by the router.

11. A non-transitory computer-readable storage medium comprising instructions which when executed by a computer cause a processor to perform:
storing a first Internet Protocol version 6 (IPv6) address of a router assigned by a first carrier and a second IPv6 address of the router assigned by a second carrier;
assigning a plurality first set of IPv6 addresses of the first carrier and a second set of IPv6 addresses of a second carrier to a plurality of devices on a local area network (LAN) served by the router;
receiving a packet from a device included on the LAN, where the packet comprises an IPv6 address of the first carrier assigned to the device;
replacing the IPv6 address of the first carrier within the packet to the second IPv6 address of the router assigned by the second carrier;
transmitting the packet to the Internet via an IPv6 connection of the second carrier;
receiving a second packet from a second device on the LAN, where the second packet comprises an IPv6 address of the second carrier assigned to the second device; and
replacing the IPv6 address of the second carrier within the second packet to the first IPv6 address of the router assigned by the first carrier, and transmitting the second packet via an IPv6 connection of the first carrier.

12. The non-transitory computer-readable storage medium of claim 11, wherein the plurality of IPv6 addresses of the first carrier assigned to the plurality of devices on the LAN served by the router are not compatible with the second carrier.

13. The non-transitory computer-readable storage medium of claim 11, wherein the processor is further configured to perform receiving a return packet from the IPv6 connection of the second carrier, wherein the return packet comprises the second IPv6 address of the router assigned by the second carrier.

14. The non-transitory computer-readable storage medium of claim 13, wherein the processor is further configured to perform identifying the device from a source address of the device included in a header of the return packet and transmitting the return packet to the device via the LAN.

* * * * *